May 8, 1956
H. A. S. HOWARTH
2,744,799
BEARING
Filed April 23, 1952
10 Sheets-Sheet 1
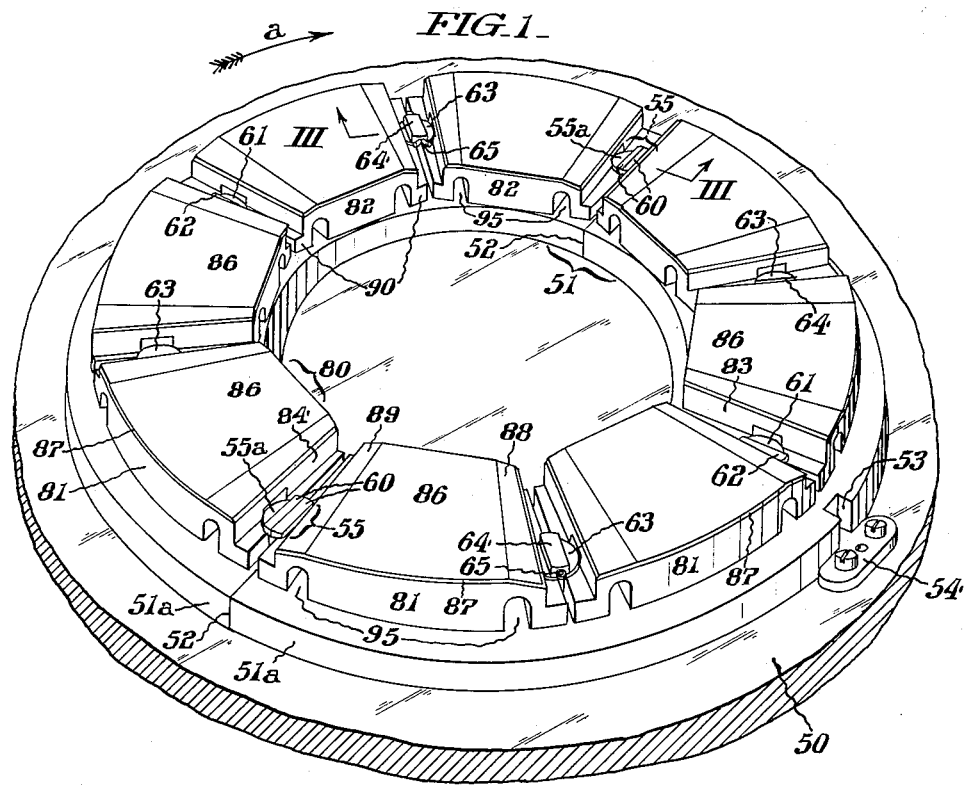
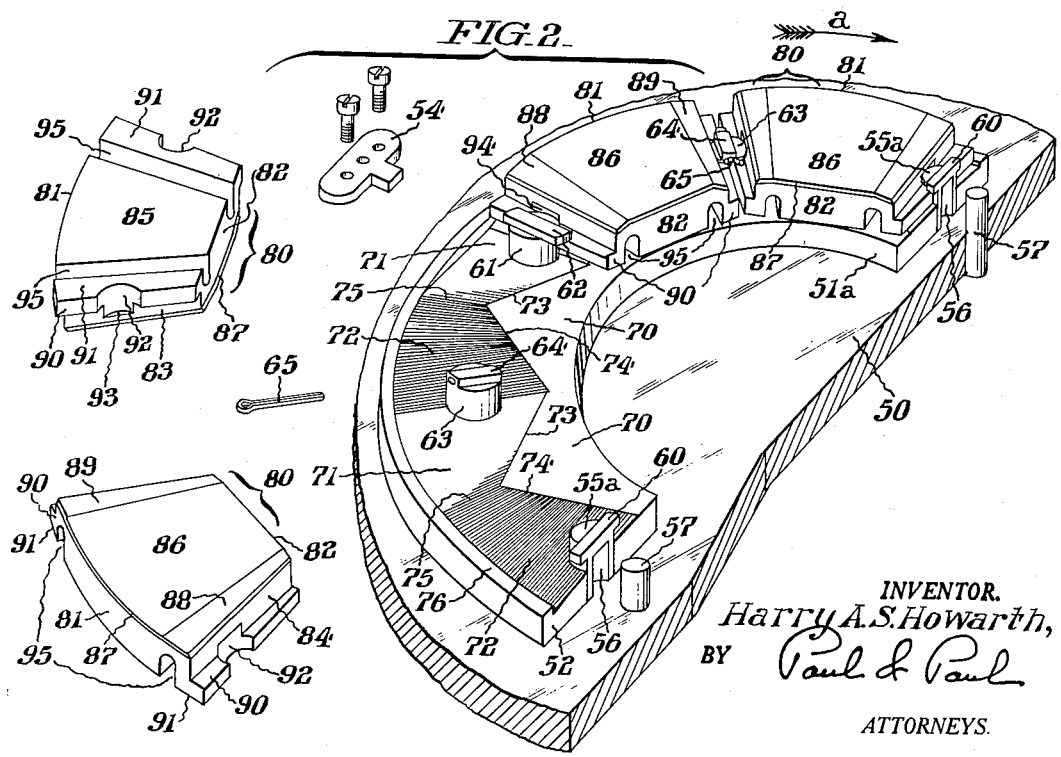
INVENTOR.
Harry A. S. Howarth,
BY Paul & Paul
ATTORNEYS.

May 8, 1956  H. A. S. HOWARTH  2,744,799
BEARING
Filed April 23, 1952  10 Sheets-Sheet 2
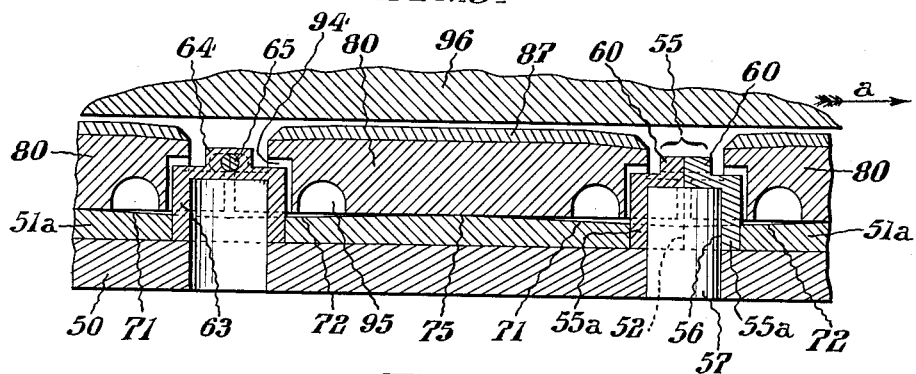
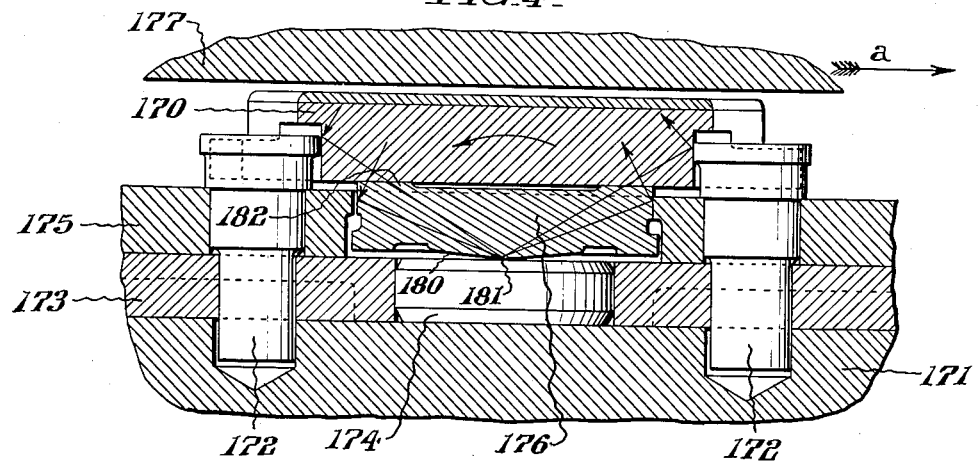
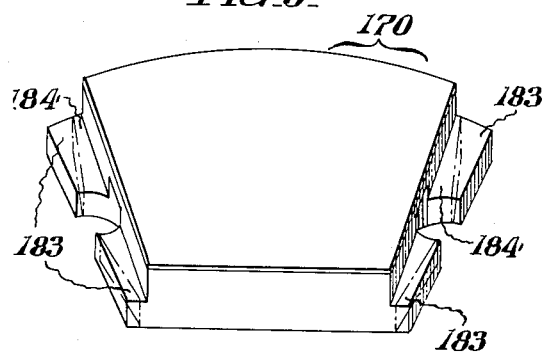
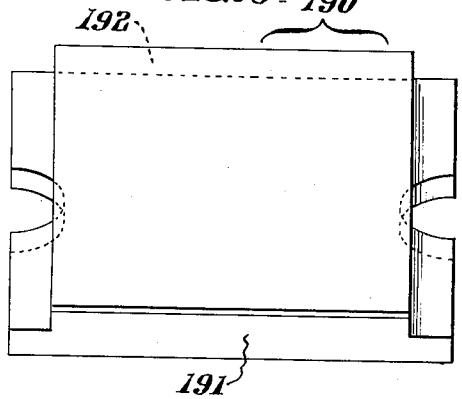
INVENTOR.
Harry A. S. Howarth,
BY Paul & Paul
ATTORNEYS.

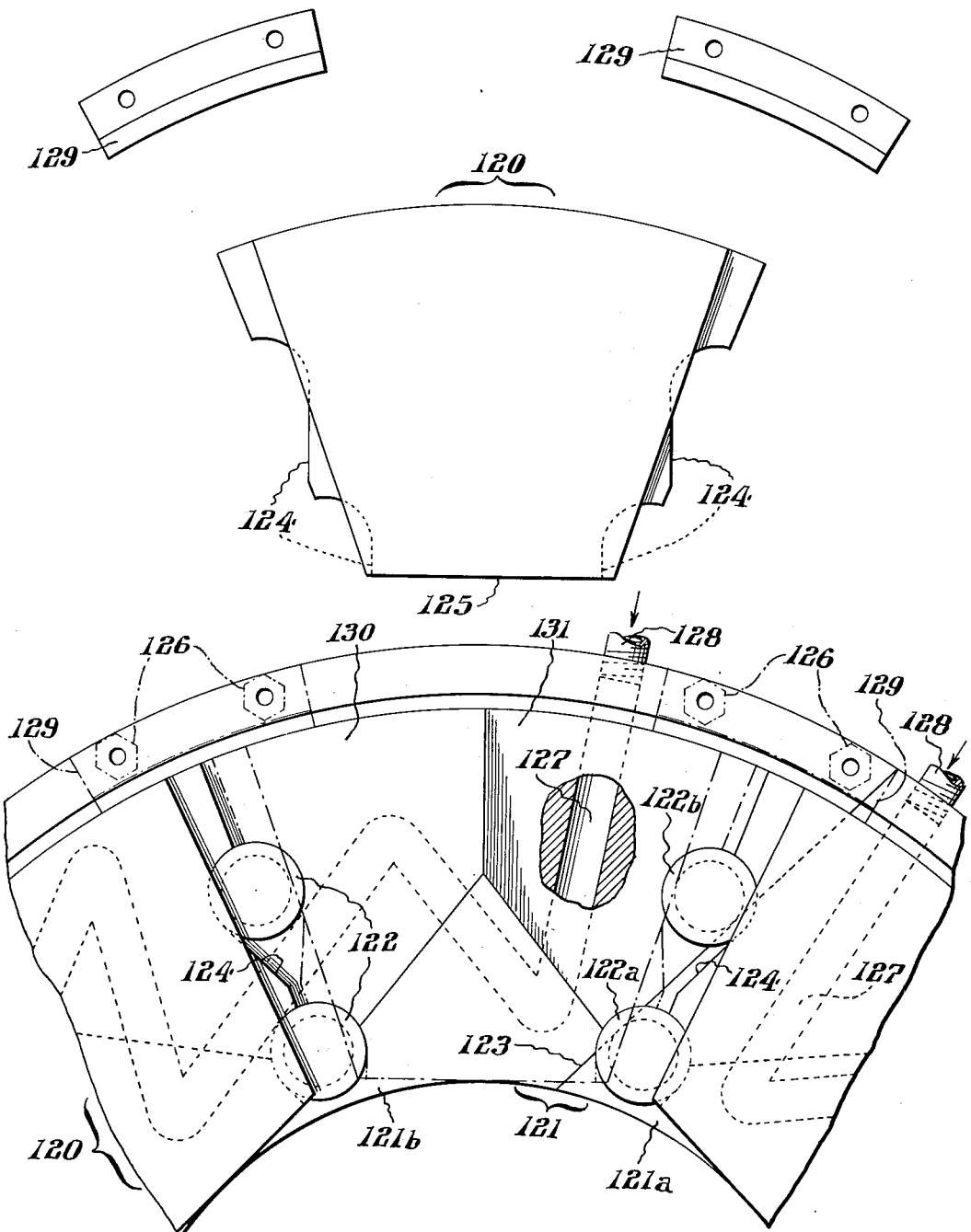

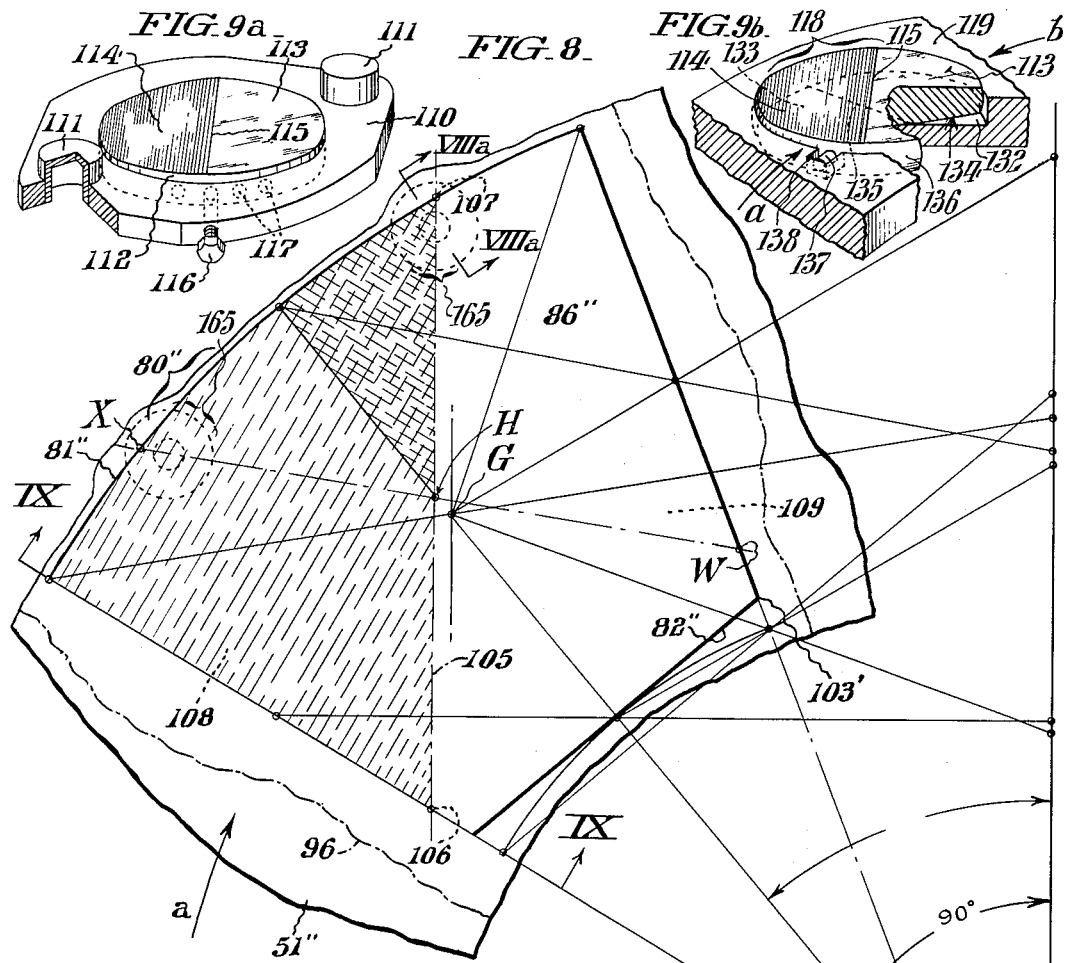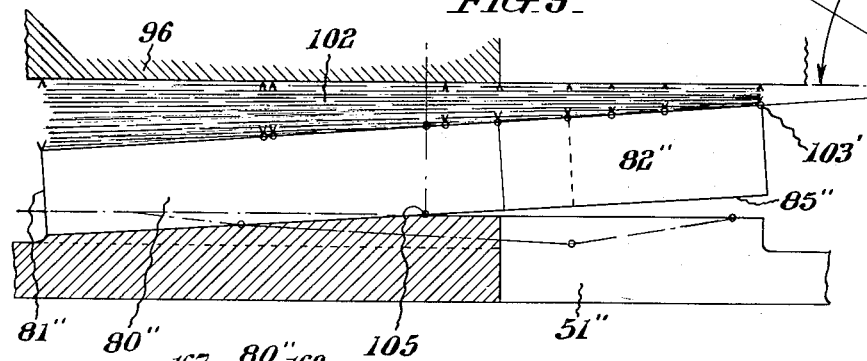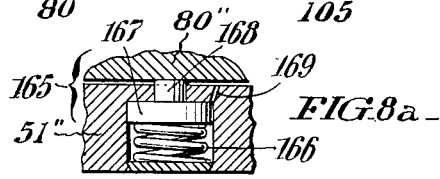

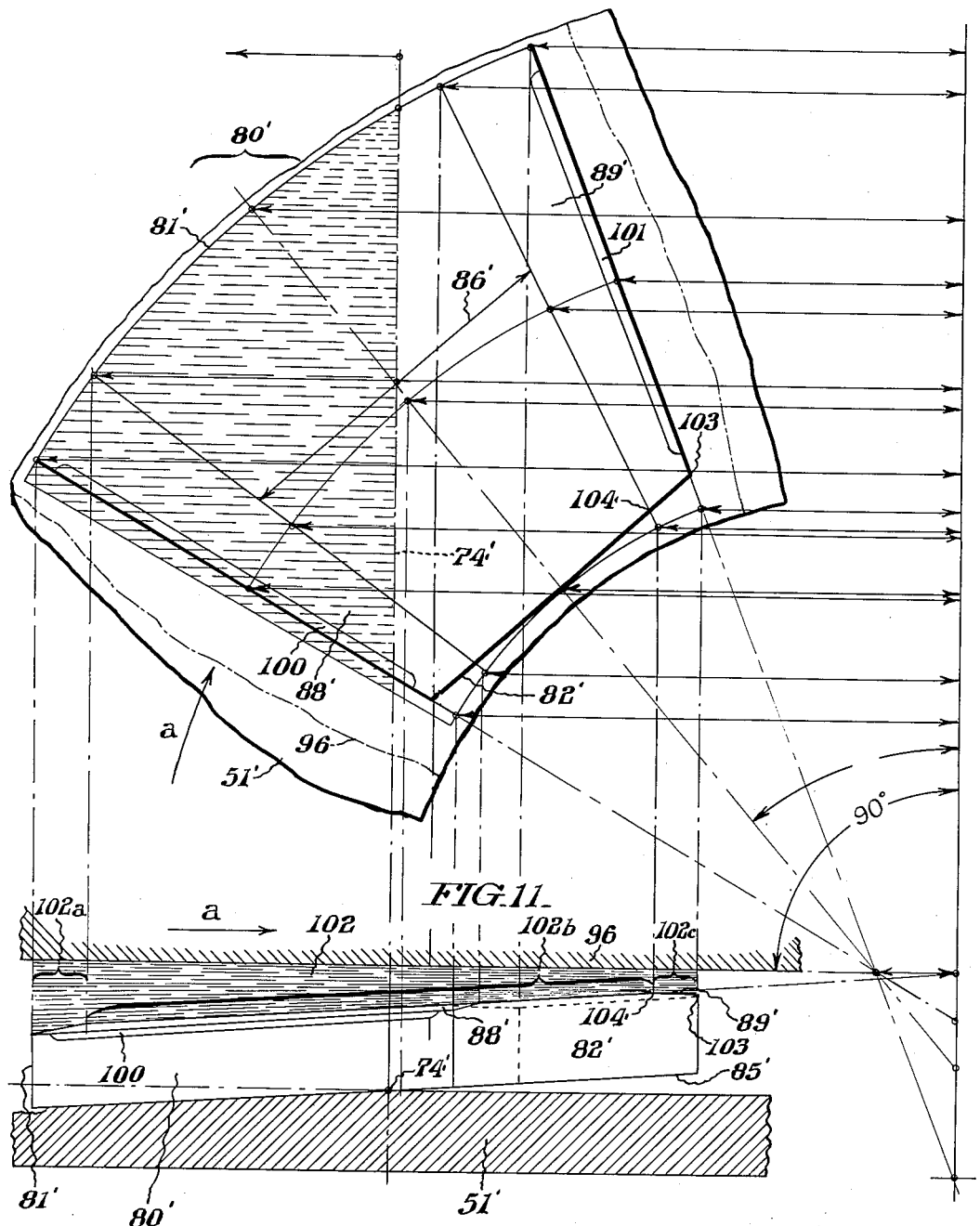
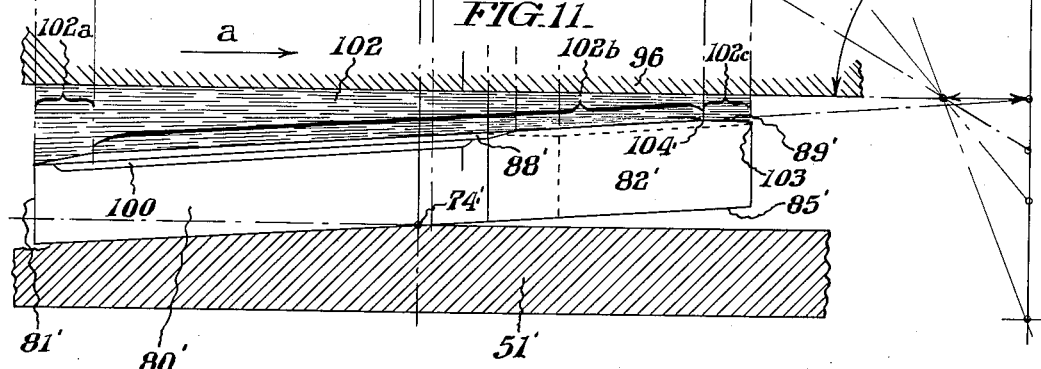

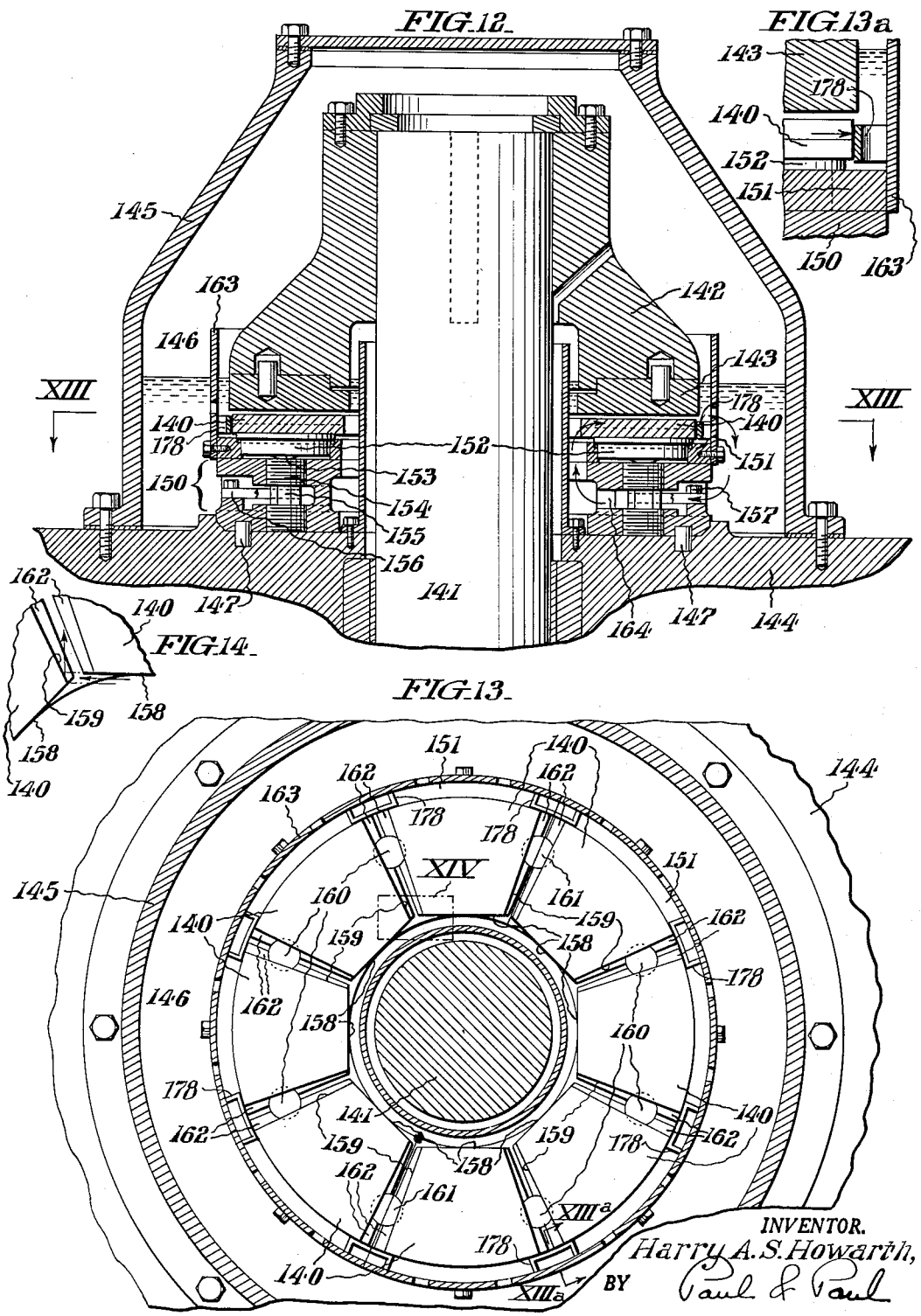

May 8, 1956 H. A. S. HOWARTH 2,744,799
BEARING
Filed April 23, 1952 10 Sheets-Sheet 7
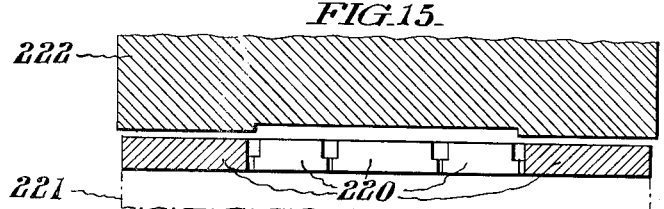
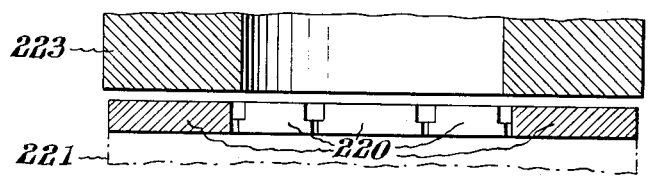
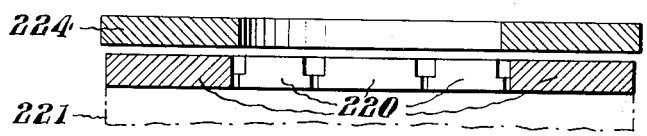
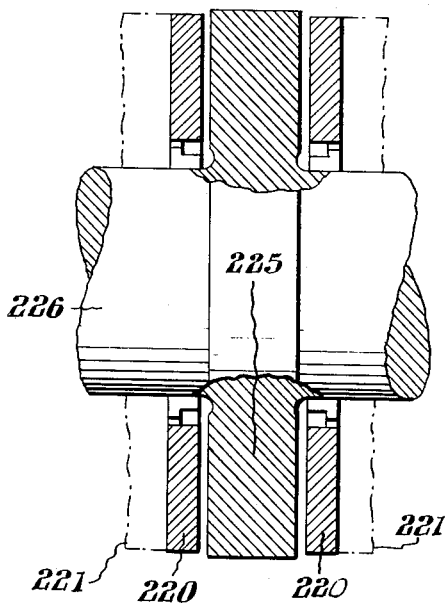
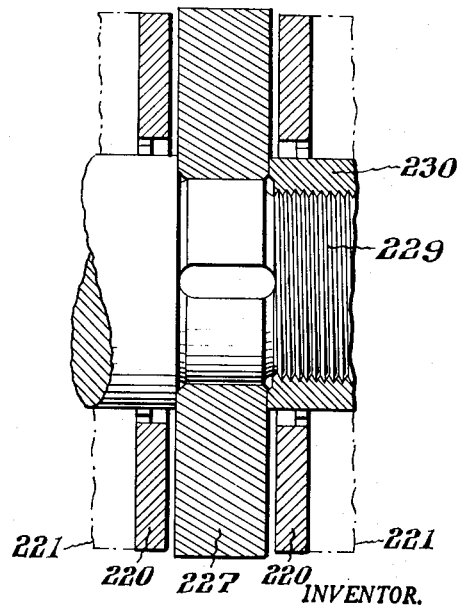
INVENTOR.
Harry A. S. Howarth,
BY Paul & Paul
ATTORNEYS.

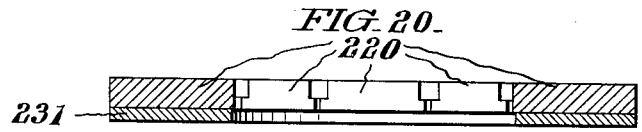
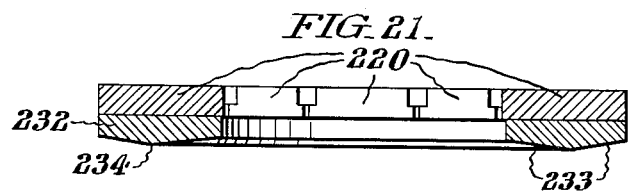
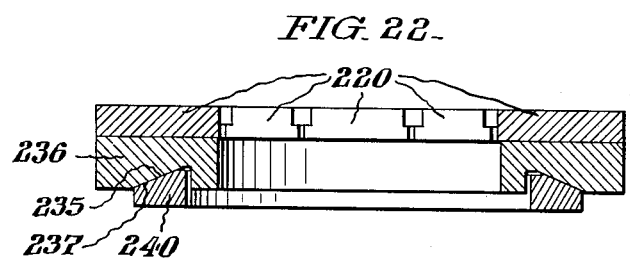
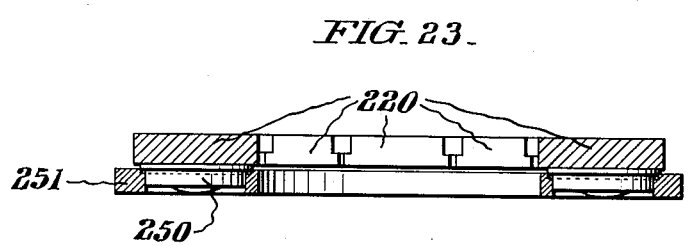
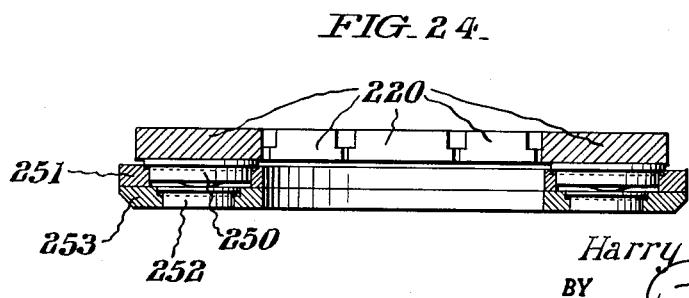

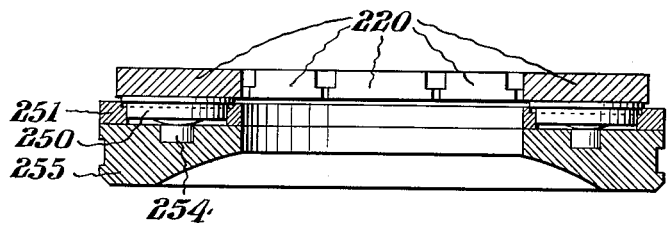
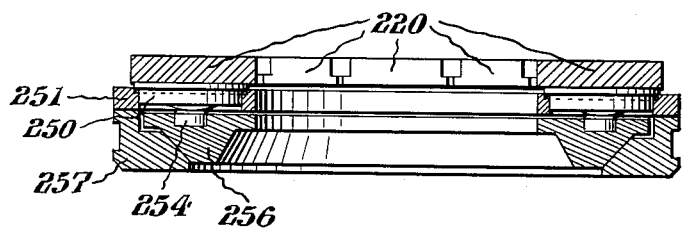
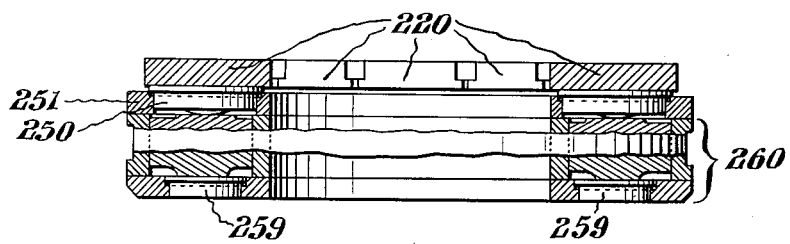
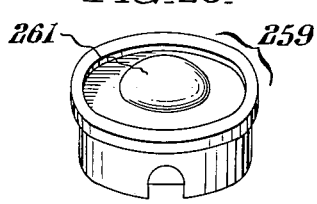 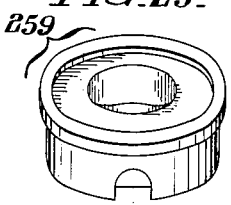

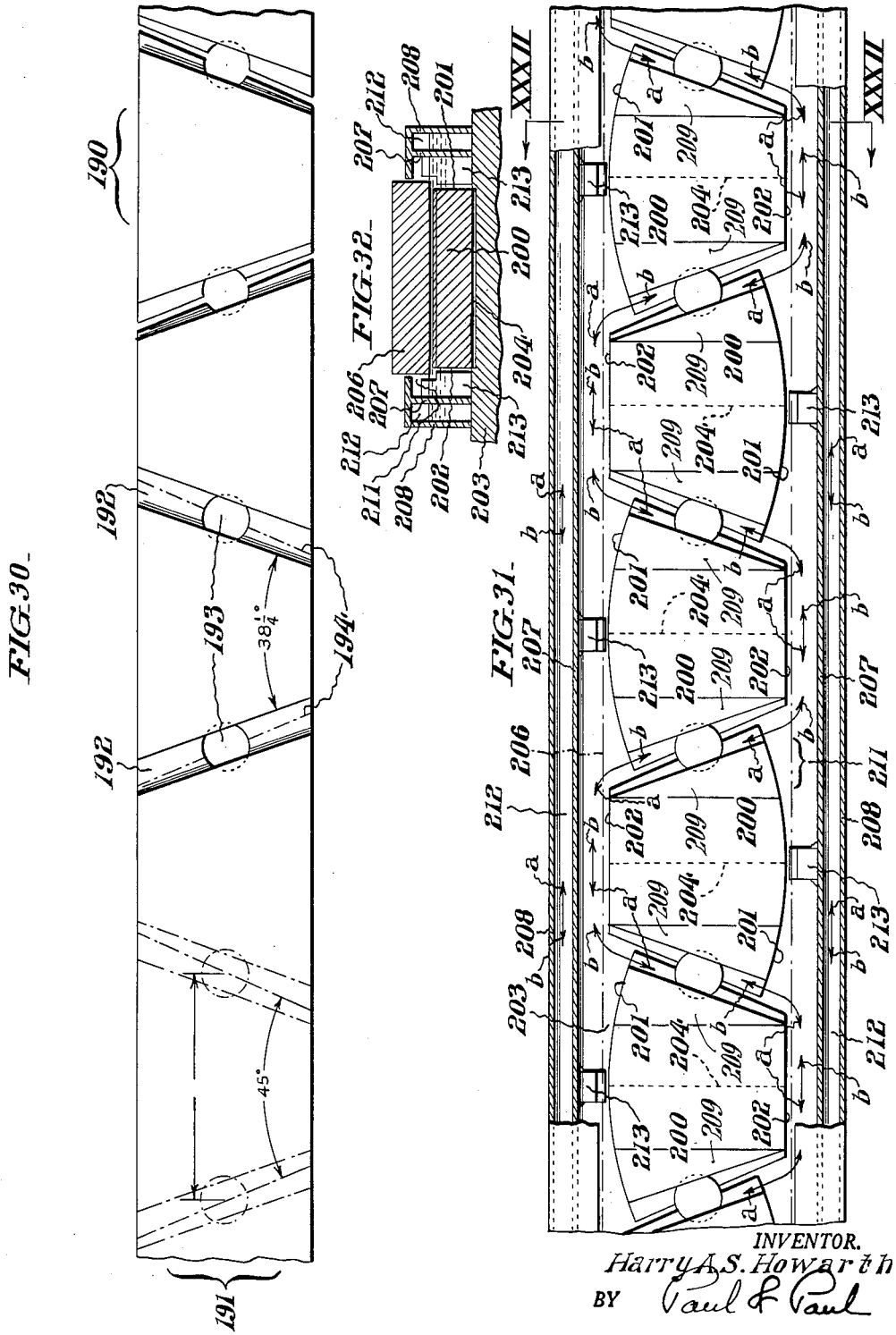

United States Patent Office 2,744,799
Patented May 8, 1956

2,744,799
BEARING

Harry A. S. Howarth, Philadelphia, Pa.; Mary Johnston Howarth, administratrix of said Harry A. S. Howarth, deceased Application April 23, 1952, Serial No. 283,944

35 Claims. (Cl. 308—160)

This invention relates to pivoted shoe bearings, and more particularly concerns the shoes for such bearings. It further relates to mounting means for such shoes which allow the shoes to tilt with respect to the opposing moving bearing face. More specifically the invention relates to pivoted shoe bearings wherein the bearing faces of the shoes are substantially parallel to their backs. The invention further relates to bearing structures including shoes of the foregoing character together with means for supporting said shoes, wherein the supporting means includes means for tilting the shoes in a bath of lubricant when the bearing is in operation to permit the formation of lubricant films of particular forms that hold the bearing faces apart so that they operate free of contact with each other.

While the invention is widely applicable to thrust bearings having flat faced pivoted shoes, it is also applicable to journal bearings having cylindrical shoes and further relates to bearings having spherical, conical or toric shoes, for example, and particularly concerns bearings of these kinds wherein the shoes have substantially parallel backs and faces.

One disadvantage inherent in many conventional bearings lies in the fact that they are specifically adapted for use with one particular kind of support, but are not readily adaptable for use with different supports interchangeably. Accordingly it is one object of this invention to provide bearing shoes which can be produced in sets of a predetermined nominal size that can be used interchangeably with any of a wide range of different supporting means. It is another aim of this invention to improve and simplify the forms and mountings of conventional pivoted shoe bearings in ways that facilitate their application to machinery of different kinds, sizes and speeds.

Conventional pivoted shoe bearings provide a lubricant film which often does not have the proper shape or thickness, and no means are provided to compensate for the natural change of thickness of the supporting lubricant film as the relative speed of the moving parts is varied. It is accordingly another object of this invention to provide bearing means wherein the shape and thickness of the lubricant film may be predetermined to provide optimum conditions over a wide speed range.

For certain kinds of relative motion, different points on the bearing faces are subjected to different relative velocities. For example, in circular type motion the relative velocity at the outer side of the face of the bearing shoe is much greater than the relative velocity at the inner side of the face of the bearing shoe. At points of excessive velocity the lubricant film tends to become very thin if the shoe is incorrectly mounted, and this tends to create excessive local wear and possible damage to the moving parts. Accordingly it is another object of this invention to provide a bearing tilting means including control means operative in response to the relative motion of the moving parts which causes the shoe to tilt at a definite predetermined angle and thereby provides an intervening lubricant film having predetermined thickness distribution characteristics.

It is a still further object of this invention to provide a bearing of the foregoing character wherein means are provided for limiting the extent of tilting movement of the bearing shoe. Still another object is to provide cooling means disposed externally of the tilted shoe together with means through which heat may be conducted for cooling the shoe in its tilted position.

In conventional bearings auxiliary means have frequently been provided for circulating oil or other lubricant and thereby preventing the bearing surfaces from overheating. It is another object of this invention to eliminate auxiliary lubricant circulating means and to provide a bearing structure wherein the lubricant is circulated, by reason of the bearing construction itself, in response to the relative movement of the parts.

When bearings operate at high speed the bearing lubricants used are usually light in order to hold the friction loss within limits essential to adequate load capacity. Under such conditions the instability of radial film thickness may lead to bearing shoe vibrations. Hence another object of this invention is to prevent radial vibrations in a tiltable bearing shoe without losing control of the lubricant film form and the freedom of the shoe to adjust itself to load, speed and viscosity.

Conventional thrust bearings are often designed not only to carry normal loads at normal speeds but also to sustain shock loads as well. Their ability to sustain shock loads depends upon the particular characteristics of the lubricant film formed, as well as upon the form and strength of the mounting means and upon the operating viscosity of the lubricant. Accordingly this invention further aims to provide bearings having high shock load capacity without sacrificing other desirable attributes previously referred to herein.

Another object of this invention is to provide a simplified bearing which may readily be manufactured from bar or other stock, with improved economy of material and with greatly reduced manufacturing cost.

Other objects and advantages of this invention, including the simplicity and economy of the same, as well as its adaptability to wide varieties of uses, will further become apparent hereinafter and in the drawings, whereof:

Fig. 1 represents a view in perspective showing one specific form of thrust bearing which embodies features of my invention;

Fig. 2 represents an exploded view in perspective similar to Fig. 1, portions of the bearing structure being cut away and other portions removed in order more clearly to disclose important details;

Fig. 3 represents a fragmentary sectional view taken as indicated by the lines and arrows III—III which appear in Fig. 1;

Fig. 4 represents a fragmentary sectional view similar to Fig. 3 showing a modified form of bearing shoe mounting means;

Fig. 5 represents a view in perspective of the shoe shown in Fig. 4;

Fig. 6 represents a view in perspective showing a bearing shoe of modified form;

Fig. 7 represents an exploded plan view of still another modified form of thrust bearing constructed in accordance with this invention;

Fig. 8 represents a diagrammatic fragmentary illustration, in plan, of one form of bearing mounting ring with a bearing shoe thereon;

Fig. 8a represents a sectional view taken as indicated by the lines and arrows VIIIa—VIIIa which appear in Fig. 8;

Fig. 9 represents a diagrammatic showing corresponding to a projection of Fig. 8 showing the character of the lubricant film produced with the bearing shoe tilted along a non-radial axis and having a flat bearing face;

Figs. 9a and 9b represent views in perspective showing still other modified forms of bearing shoe mounting means embodying features of this invention;

Figs. 10 and 11 are diagrammatic views similar to Figs. 8 and 9 showing the character of lubricant film attained when the bearing face of the shoe is beveled in the manner illustrated in Figs. 1–3;

Fig. 12 represents a vertical axial sectional view showing another modified form of vertical thrust bearing embodying features of this invention, in combination with housing means therefor, some of the internal parts being partly broken away in order to expose others to view;

Fig. 13 represents a sectional view in plan, taken as indicated by the lines and arrows XIII—XIII which appear in Fig. 12;

Fig. 13a represents a sectional view taken as indicated by the lines and arrows XIIIa—XIIIa which appear in Fig. 13;

Fig. 14 represents an enlarged fragmentary view of the elements indicated by the dot-dash area XIV which appears in Fig. 13;

Figs. 15–17 represent vertical axial sectional views showing applications of bearing shoes in modified forms of bearing structures;

Figs. 18 and 19 represent views in side elevation, with certain parts broken away and shown in section, illustrating modified forms of bearing structures wherein bearing shoes embodying features of this invention are applied to a rotating thrust collar;

Figs. 20–27 represent diagrammatic vertical axial sectional views showing modified forms of mounts on which thrust shoes may be supported in accordance with this invention;

Fig. 28 represents a view in perspective of some of the discs illustrated in Fig. 27;

Fig. 29 represents a view in perspective of the other one of the discs illustrated in Fig. 27;

Fig. 30 represents a plan view of a piece of bar stock showing successive stages in the method of manufacturing bearing shoes embodying features of this invention;

Fig. 31 represents a plan view of a bearing embodying features of this invention, showing the application of my bearing shoes for straight line reciprocating motion; and Fig. 32 represents a sectional view taken as indicated by the lines and arrows XXXII—XXXII which appear in Fig. 31.

Turning now to the specific form of the invention shown in Figs. 1–3 of the drawings, the bearing structure there shown is supported on a deck 50. A split mounting ring 51, consisting of two halves or sections 51a split at 52, lies upon the deck 50. Each section 51a is notched at 53 to receive a key 54 which is screwed or otherwise secured to the deck 50. The ring sections 51a are thereby secured relative to one another and to the deck 50. The mounting ring 51 shown in the drawings includes a pair of diametrically opposed split dowels 55 which are vertical with respect to the flat upper face of the mounting ring. Each dowel 55 is hollow and split into halves or sections 55a, each section 55a having a bore providing a semi-cylindrical face 56. The bores of the split dowels 55 are arranged to fit the diametrically opposed vertical mounting pins 57 which are fixed to the deck 50. Thus the split dowels 55 and mounting pins 57 coact with the key 54 to support the assembled mounting ring 51 firmly in position on the deck 50.

Each split dowel section 55a carries a fixed, radially disposed retainer lug 60 which is spaced above the upper face of the mounting ring 51. Each retainer lug 60 projects radially inwardly and outwardly beyond the extremities of its split dowel section 55a.

Spaced equally between the split dowels 55 are a pair of diametrically opposed full dowels 61. They are fixed to opposite mounting ring sections 51a and carry fixed double size retainer lugs 62 similar in arrangement to the retainer lugs 60.

Four full dowels 63 are also fixed to the mounting ring 51, in diametrically opposed pairs. Each full dowel 63 is spaced equally between a split dowel 55 and a full dowel 61. Each full dowel 63 has a radial ridge 64 formed on top thereof, the ridge 64 having a radially directed hollow bore adapted to receive a cotter pin 65.

As indicated most clearly in Fig. 2, the upper face of the mounting ring 51 includes a plurality of substantially triangular flat horizontal surfaces 70 each of which is disposed on the portion of the mounting ring 51 which extends between adjacent dowels. The flat surfaces 70 are disposed along the inner edge of the mounting ring and are subtended by a pair of bevelled faces 71 and 72. The bevelled faces 71, 72 are flat and slant diagonally in the planes of the dull knife edges 73, 74 along which they intersect the corresponding flat horizontal surface 70. One bevelled face 71 of each pair slants downwardly outwardly of the mounting ring 51 and downwardly toward one dowel, while the other bevelled face 71 of the pair slants downwardly outwardly of the mounting ring 51 and downwardly toward the other dowel. The bevelled faces 71, 72 also intersect to form downwardly outwardly slanting edges 75 which are substantially midway between dowels. Around the outer ends of the bevelled faces 71, 72 is a peripheral wall 76 which extends completely around the mounting ring 51.

It will be appreciated that the bevelled faces 71, 72 are preferably formed at a very small angle to the horizontal. This angle has been exaggerated in the drawings for the sake of clarity.

The number 80 designates a bearing shoe each of which, as shown in Figs. 1–3, has a curved outer side 81, flat inner side 82, and radial end walls 83, 84. Each shoe 80 has a flat back 85 and a flat face 86 which is parallel to the flat back. Each bearing face 86 is composed preferably of hard bearing material 87 which has capacity to resist wear, and has bevelled end portions 88, 89 forming flat, wedge-shaped bevelled faces thereon. Formed integrally at the ends of each shoe 80 are a pair of flanges or wings 90 having back faces 91 flush with the flat back 85. The wings 90 are bored at a curvature substantially equal to the curvature of each dowel 55, 61, 63 to provide cavities 92 in which the dowels are received. The flat upper face 93 provided at the end of each bore is arranged to provide clearance space 94 above the top of each dowel, as shown in Fig. 2, when the shoe and dowel are assembled. These dowels are accurately and evenly spaced upon the mounting ring in a manner to receive between them the individual tiltable shoes. These dowels are at the ends of tangents to the mean diameter of the shoe faces. This is the basis of the interchangeability of all shoes shown.

Each shoe 80, of Figs. 1–3, also has formed, in its under face, a pair of radially directed channels 95 each having an inverted U-section. The channels 95 extend in a straight line path from the outer side 81 to the inner side 82 of the shoe. They form return passages for oil or other lubricant which may be circulated outwardly over the wings 90 and inwardly through the passages 95 to lubricate and cool the shoe 80. When the mounting requires such a return flow it may be had in this way or by means of passages in the members below the shoes.

In the assembled bearing, each alternate dowel retainer lug 60, 62, is spaced above one wing 90 of each shoe 80, while a cotter pin 65 is spaced above the other wing 90 of each shoe 80. Each shoe 80 is thereby retained against removal from the mounting ring 51 but is free to lower and to tilt and thereby bring the flat back 85 into face contact with either of the bevelled surfaces 71, 72 or with the flat surface 70 of the mounting ring. As appears more clearly in Fig. 3, clearance is also provided between the bored cavities 92 and adjacent dowels to permit free shoe tilting.

The bearing structure shown in Figs. 1–3 is readily assembled by locking the split mounting ring sections 51a, 51a on the deck 50 utilizing the keys 54. Or if desired this may be done by bolting the halves by means of lugs, not shown, extending outward at the joint, for example. In order to assemble the shoes upon the supporting plate 51a each shoe is then held with its back 85 at an angle to the plane of the flat surfaces 70 of the mounting ring 51 with one wing 90 above the opposite wing 90, and the lower wing 90 is then slid under one of the retainer lugs 60 or 62. The upper wing 90 is then lowered on its corresponding dowel and locked in position by a cotter pin 65. The bearing structure is completed by assembling a plurality of similar shoes 80, as indicated in Fig. 1. Of course the number of shoes, as well as their spacing from one another, may be varied to suit the need, so long as the supports are independent and adequate.

In Fig. 3 the number 96 designates a runner which may be a revolving collar or any other moving part. It will be appreciated that the runner 96 may also be stationary with the bearing shoes revolving, or both the runner 96 and the bearing shoes may be revolving either in opposite directions or at different speeds in the same direction. All such conditions are intended to be embraced herein by referring to the shoes 80 and runner 96 as "relatively moving." While the shoes and runner are immediately adjacent to one another and are "relatively moving" under load, they are separated by a lubricant film from actual contact. As will become apparent, the shape and thickness of this lubricant film are important and critical. When the bearing base and shoes are at rest the runner load is carried through the shoe body to the flat horizontal face 70 of mounting ring 51, Fig. 2. Thus a flat area of substantial extent is provided for absorbing thrust load upon each shoe while the parts are stationary with respect to one another.

In operation, the relatively moving parts of Figs. 1–3 are immersed in oil or other lubricant and relative movement is established, usually by rotating the runner 96 (Fig. 3). Assuming the runner 96 is moving continuously in the direction indicated by the arrows (a), the viscous drag of lubricant between shoe face 86 and runner 96 causes each shoe 80 (Fig. 2) to tilt along the non-radial knife edge 74 (which is parallel to the working face of the runner 96) with one portion of its flat back 85 lifted off the horizontal flat surface 70 and another portion of its flat back 85 approaching toward the bevelled face 72. For rotation in this direction I call the end wall 84 the leading end of the shoe 80 and the end wall 83 the trailing end of the shoe 80. The bearing faces of the shoes, being also shown with bevels in Fig. 2, the bevelled face 88 is correspondingly termed the leading bevelled face, and bevelled face 89 the trailing bevelled face, since, as I apply the terms "leading" and "trailing," the lubricant film between the relatively moving parts always enters at the leading end of the shoe 80 and leaves at the trailing end of the shoe 80.

As the velocity of relative movement increases, the angle of tilt gradually increases. At a constant relative speed, equilibrium is established and the angle of tilt becomes constant. Preferably, at the relative speed of rotation in the direction of arrows (a) for which the bearing is designed, the angle of tilt of each shoe under stable equilibrium conditions is equal to the angle between the horizontal face 70 and the adjacent bevelled face 72 of the mounting ring 51, and the shoe back will lie against the bevel 72. Should the relative speed exceed the design speed, each shoe back 85 is urged more tightly against the corresponding bevelled face 72 which constitutes stop means serving to limit the extent of tilting movement of the shoe 80 and, therefore the lift of the reverse face above the shoe face follows a law of reduced rise. The bevel is, by design, limited to a definite angle, and the desired limit of tilt can thus be predetermined. Should the relative speed be reduced the angle of tilt of shoe 80 is correspondingly reduced and the flat back of each shoe returns to its position on the horizontal mounting ring 51 when relative movement is stopped.

For rotation of the runner 96 in the opposite direction, each shoe 80 tilts about the dull knife edge 73, Figs. 2 and 3, and, at design speed, each shoe 80 is tilted in equilibrium with a portion of its flat back 85 immediately adjacent to the bevelled face 71. Thus each shoe can tilt along a predetermined axis disposed at an oblique angle, or non-perpendicular angle, to the path of relative movement of the bearing shoe and runner, in response to such relative movement, either clockwise or counterclockwise.

As indicated in Fig. 8, the knife edge 105 on the mounting ring extends non-radially from the inner edge 106 to the outer edge 107 of the ring, and this provides only one bevelled face 108 and one substantially horizontal face 109. Not only is the knife edge 105 longer than the knife edges 73, 74 of Figs. 1–3 but the horizontal and bevelled faces 108, 109 have more area than the corresponding faces 70, 71, 72 of Figs. 1–3, for a given size mounting ring. While this arrangement does not provide for reverse shoe tilting, it gives improved shoe stability, particularly at relatively high speeds, as will further become apparent.

The unidirectional mounting ring of Fig. 8 may be converted to a reversible mounting ring by forming another knife edge along the line WX (Fig. 8). In reversible mounting rings of this character the center of gravity G of the shoe is quite near the point of intersection H of the knife edges. Under some conditions there is a tendency for such a shoe to vibrate or flutter along the axis of the knife edge, since the center of pressure of the lubricant film may be near the intersection H, with the shoe therefore supported principally at the point H rather than along the entire knife edge. This tendency to flutter along the knife edge axis is effectively controlled by the dampers 165 which are on the mounting ring at the outer ends of the knife edges on which the shoe tilts, see also Fig. 8a. Mounting ring 51" has a cylindrical bore carrying a coil spring 166 urging a cylinder 167 and piston 168 upwardly. The upper end of the piston 168 contacts the bottom of shoe 80" at its outer edge. The entire bearing structure is submerged in fluid lubricant which flows into and out of the cylindrical bore through a restricted passage 169, thus providing a damping effect.

Fig. 9a shows a modified form of mounting means wherein the axis of tilt may be varied and adjusted at any desired angle. A mounting plate 110 carries dowel caps 111 which are hollow and adapted to fit over pins on a deck (not shown), as heretofore described. A disc 112 having a horizontal flat face 113 and a bevelled flat face 114 which intersect to form a dull knife edge 115 is rotatably disposed in a central aperture in mounting plate 110. Threaded through the side of mounting plate 110 is a set screw 116 the end of which enters into depressions 117 formed in disc 112, thereby securing the disc 112 against rotation. A bearing shoe such as the shoe 80 shown in Figs. 1–3 may be placed on the disc 112 to form an assembled bearing unit, and a plurality of such assembled bearing units may be disposed in the desired arrangement to serve as bearings. Moreover, the angle of the knife edge 115 to the path of motion may readily be varied in order to determine the optimum angular relation in any particular instance.

Fig. 9b shows a modified form of disc 118 which provides for reversible relative rotation. The disc 118 is mounted in a cylindrical opening in a mounting ring 119, said mounting ring having a flat bottom 132 in said opening. The disc 118 has a top horizontal flat surface 113 and a top bevelled surface 114, forming a dull knife edge 115, as in Fig. 9a. It also has a bottom flat horizontal face 133 and a bottom bevelled face 134, such faces forming a bottom dull knife edge 135. Bottom knife edge 135 extends in a plane parallel to top knife edge 115, but the knife edges are respectively at opposite angles to the path of relative rotation.

The disc 118 has a spherical-section side wall 136 carrying a peg 137 the axis of which extends along a line perpendicular to the bottom knife edge 135, and moves up and down in a vertical slot 138 in mounting ring 119 when the disc 118 rocks or tilts about knife edge 135. The disc 118 is held against rotation by the peg 137 and slot 138.

For the direction of rotation of the runner as indicated by the arrow (a) in Fig. 9b, the shoe (not shown) tilts over the top knife edge 115, while for rotation of the runner in the opposite direction as indicated by the arrow (b) the shoe lies flat against the horizontal top face 113 and the shoe and disc 118 tilt together as a unit over the bottom knife edge 135. The disc 118 may merely supplement the bevels of Fig. 2 or it may provide the only tilting means and thus simplify the cage that holds it in place.

The effect of the non-radial tilting movement of each shoe 80 in response to viscous lubricant drag, just explained with Figs. 8, 9, 9a and 9b, is further apparent from Figs. 10 and 11. In the modification shown, the shoe bearing face is not flat but has bevels, as shown in Figs. 1 and 2. The leading slightly bevelled face 88' of the shoe 80' has at its leading radial edge a chamfer 100, which forms a face angled about 45° to the bevelled face 88', to receive the impact pressure of lubricant in a high speed bearing. The leading end chamfer 100 preferably terminates just before reaching the outer and inner sides 81', 82' of the shoe. The trailing bevelled face 89' has a similar trailing end chamfer 101.

With the shoe 80' tilted along the axis of the dull knife edge 74', the lubricant film 102 is of substantially wedge form and it averages thicker at the outer side 81' of the bearing shoe 80' than at its inner side 82'. This relationship is predeterminable by the angularity of edge 74' with relation to a radial line at its middle. This is important and advantageous since the relative velocity between the runner and shoe is greater at the outer side than at the inner side, and a thicker lubricant film is accordingly required at the outer side. As shown in Fig. 11, the lubricant film 102, whose main body 102b has the largest area, includes a more sharply inclined leading wedge portion 102a, and a similar face 102c at its trailing end, which is designed to be about parallel with the runner 96 when the bearing is operating at designed speed. The section of the film with its end bevels 89' is fully apparent from Fig. 11, wherein the trailing bevel 89' is substantially parallel to the working face of the runner and therefore does not cause a pressure build-up at the trailing end of the shoe. Similarly, the bevelled portion 89' at the leading end of the film will cause an increase in the steepness of the taper at the beginning of the film. This need be little more than is needed to remove part of the concavity of the film and will therefore not cause any loss of pressure but will cause it to build up faster than it otherwise would. Hence, because of the bevelled portion 89', the center of pressure will be drawn nearer the leading end of the film and the shoe will more positively lie down on the leading bevel of its mounting and thus make the reversibility of the bearing more secure for all speeds.

In Fig. 7 of the drawings, the modified shoe 120 is substantially similar to, and is interchangeable as to area of face with the shoe 80. However it is particularly constructed as a large bearing shoe and each shoe 120 is removable individually from the mounting ring 121 which has vertically extending dowels 122 disposed in radially aligned pairs. The outer dowels are placed along a line tangent to the circle which lies midway between the inner and outer edges of the shoe. The mounting ring 121 is split along straight, non-radial lines 123 which extend between the radially-aligned dowels 122, 122b, to form two mounting ring halves 121a, 121b. Dowel 122a is mounted on mounting ring 121a while dowel 122b is mounted on mounting ring 121b. All the dowels 122, 122a, 122b are full dowels and each half of the split mounting ring 121 is preferably mounted on a deck as heretofore described, or in any other convenient manner. Portions of each shoe 120 which lie inwardly of each dowel 122 are cut away to provide the angled faces 124 which are substantially perpendicular to the inner side wall 125 of the shoe 120 and facilitate removal of each individual shoe 120 in a radial direction from the mounting ring. This feature can readily be incorporated into the other shoes shown and described. Straps 129, and bolts 126, threaded into the mounting ring 121, serve to retain the shoes 120 in position for normal use. Moreover the backs of the straps 129 extend up above the wings of the shoes and tend to restrict the flow of lubricant which flows outwardly through the channels between the shoes. This minimizes the danger of aerating the lubricant, as will further become apparent.

Each half of the mounting ring 121 has an internal passage at 127 for cooling water or other cooling fluid which is introduced through inlets 128. Not only do the passages 127 provide means for cooling the mounting ring 121, but they coact with the flat bevelled faces 130, 131, and the flat backs of the bearing shoes 120 to establish intimate contact with the bearing shoes over a considerable area and thereby cool the bearing shoes 120. Thus the leading end of the shoe is maintained at a lower temperature than its trailing end. It will be appreciated that cooling means of this character may readily be applied with equal advantage to the apparatus shown in Figs. 1–3, as well as other figures of the drawings. By cooling the shoe back when the shoe is tilted, the lubricant film is kept cold at the place where such cooling is most needed, its viscosity accordingly increases (when the lubricant is oil), and this results in a thicker film which increases the safety of operation of the bearing under the load and speed conditions imposed upon it. Moreover, the presence of the thicker film of cooler more viscous oil at the leading end of the shoe tends to shift the center of pressure of the lubricant film toward the leading end of the shoe and ensures its being well ahead of the center of gravity of the shoe face. When the bearing is reversible this is important since, with revolution in either direction, the cooling of the leading end of the shoe shifts the center of pressure toward the leading end and tends to seat the shoe firmly in its tilted position and resists any tendency of the shoe to vibrate or flutter about its pivot.

Figs. 12–14 show the application of bearing shoes 140, which are similar to shoes 80 and 120, to a thrust bearing structure applied to the end of a revolving shaft 141. A hub 142 having a runner 143 is affixed to the end of shaft 141. The shaft 141 passes through a deck 144 to which is bolted a housing 145 forming a reservoir 146 for oil or other lubricant. Fixed to the pins 147 extending upwardly from the deck 144 is an adjustable base ring comprehensively designated by the number 150. Mounted on the adjustable base ring 150 is a cage 151 in which are mounted a plurality of pivoted discs 152. Each pivoted disc 152 has a spherical protuberance 153 on its bottom face which is supported on a vertically adjustable bolt 154 threaded into the adjustable base ring 150 having a hexnut 155 formed at its center. The top face of bolt 154 supports the pivoted disc 152 which has capacity to rock and tilt thereon, appropriate clearance being provided between each disc 152 and the surrounding cage 151. A wrench 156 which engages each hexnut 155 may be turned to raise or lower each pivoted disc 152 and may be set in any position by set screw 157. A bearing shoe 140 is supported on top of each pivoted disc 152 between full dowels 160 or split dowels 161 which are fixed to the adjustable base ring 150. Each shoe 140 is substantially identical to the shoe 80 shown in Figs. 1–3, but does not necessarily have any counterpart of the channels 95.

It is important to observe that the inner side walls 158 of the respective bearing shoes 140 are flat and at angles to one another. As shown, they are tangent to a circle drawn about the center of revolution of the runner 143. As indicated by the arrows in Fig. 14, lubricant is caused to flow along the flat inner side wall 158 of one shoe by reason of the revolution of runner 143 along a path tangential to the circular movement of the runner 143. In view of the spacing between the shoes, the lubricant leaving one shoe 140 impinges upon the projecting portion of the leading end wall 159 of the adjacent shoe 140. The flanges 162 of shoes 140 form radial spaces through which lubricant impinging on the wall 159 flows outwardly over the tops of dowels 160, 161 and thereby establishes lubricant circulation as indicated by the arrows in Fig. 12. A splash guard 163 which is affixed to the cage 151 and surrounds the shoes 140 has perforations permitting free lubricant circulation, and the adjustable base ring 150 has radial bores 164 which permit return of lubricant inwardly to complete the lubricant circulation cycle.

Fixed to the splash guard 163, radially outwardly of the spaces between the adjacent shoes, are buffer plates 178 which are disposed against the outer edges of the adjacent shoes. Each buffer plate 178 extends up to a level slightly below the working faces of the adjacent shoes 140 and is disposed in the path of flow of the outwardly directed lubricant. Buffer plates 178 serve to restrict the rate of flow of lubricant outwardly and thus prevent undue reduction of oil level at the inner edges of the shoes. This is important since the lubricant tends to become aerated between the working faces if its supply level falls too low, and this aeration results in excessive wear and possible breakdown.

While similar lubricant circulation is attained in the device shown in Figs. 1–3 by the flat inner side walls 82, the channels 95 are included in the shoes of Figs. 1–3 for returning the circulating lubricant inwardly of the shoe, no means being provided in the relatively thin mounting ring 51 for this purpose. However the mounting ring 51 may, if desired, be bored or otherwise fitted with suitable return passages, and/or channels may be provided in the deck.

Figs. 4 and 5 of the drawings show a bearing shoe 170 similar to those previously described. The shoe 170 is readily combined with a modified form of mounting means which includes a deck 171, dowels 172, a ring 173 with circular apertures each receiving a pivot disc 174, a cage 175 and a bearing shoe support member 176 on which the shoe 170 is supported. A runner 177 is immediately adjacent to the shoe 170 and, as illustrated, moves in the direction indicated by the arrow (a) in Fig. 4. The support member 176 has a conical bottom face 180 (which may be spherical, if desired) forming a central pivot point 181 which bears upon the pivot disc 174. An upstanding peripheral ring face 182 which contacts the flat back of the shoe 170 which has freedom to tilt resulting from the fact that the shoe back can slip on the support member 176. As will be apparent particularly from Fig. 5, corner portions 183 may be cut away from the flanges 184 along the dot-dash lines thereby providing means whereby more or fewer than eight such shoes may be arranged in circular form without decreasing the area of the face of shoe 170.

Still another modified shoe 190 appears in Fig. 6. The shoe 190 has flat inner and outer faces 191, 192 and is of generally rectangular form. It may be arranged with similar shoes in arcuate form, particularly if cutaways like 183 are provided, or it may preferably be arranged in straight-line formation with intervening dowels as heretofore described.

Figs. 30–32 show arrangements of bearing shoes in straight-line formation for use with straight-line reciprocating motion, for example. In Fig. 30 trapezoidal bearing shoes 190 are manufactured from rough-machined bar stock 191 by milling a plurality of staggered channels 192 across the bar, boring equally-spaced dowel holes 193 which are disposed along the central longitudinal axis of the bar, and saw cutting the shoes apart along the lines 194. The bearing faces can be babbitted after milling while the shoes are in bar form. For producing a shoe of varied application, each mill cut 192 is at an angle of about 38¼ degrees to each adjacent mill cut 192, while the corresponding angles between adjacent saw cuts 194 are about 45 degrees. The shoes are then preferably babbitted and faced and the babbit faces are scraped in the usual manner to make them flat. The backs of the shoes of the set are ground to a uniform and smooth finish and thickness. Figs. 31 and 32 show shoes 200 which are similar to trapezoidal shoes 190 but have their longer side walls 201 of arcuate form and their shorter side walls 202 straight and flat. The shoes are mounted on a support plate 203 which has bevelled upper faces forming spaced-apart transverse knife edges 204 on which the shoes 200 are centrally supported with capacity to tilt longitudinally in line with the path of reciprocation of a runner 206. The shoe faces are double bevelled at 209, 209 parallel with the knife edges 204 to prevent the outer corners of the shoe faces contacting the element 206. Upstanding from the sides of the support plate 203 are inner side walls 207 and outer side walls 210 forming a lubricant reservoir 211 and lubricant return conduits 212, 212. Fixed to the inner faces of inner side walls 207 are dam elements 213, one to each shoe 200, disposed alternately on opposite inner side walls 207 closely adjacent to each shoe side wall 201. It will be appreciated that, when the runner 206 moves toward the left in Fig. 31, the lubricant is drawn to the left through the channels between the shoes 200 and controlled by the dam elements 213, and recirculates toward the right in the return conduits 212, 212 which communicate with the lubricant reservoir at each end of the support plate 203. Reciprocation of runner 206 in the opposite direction circulates the lubricant in the opposite direction, as indicated by the arrows (b).

The versatility of bearing shoes made according to this invention and their application to different mounts will appear particularly from Figs. 15–29. Fig. 15 shows bearing shoes 220 mounted on a mounting element 221 directly opposite the end of a revolving shaft 222 which serve to absorb thrust at the end of the shaft. Fig. 16 shows a hub end 223 and Fig. 17 shows a thin facing thrust collar 224 each of which bears upon a set of shoes 220. In Fig. 18 two sets of thrust shoes 220, mounted on two sets of stationary mounting elements 221, bear against opposite faces of a thrust collar 225 formed integrally with a shaft 226. The thrust collar 227 in Fig. 19 is similar to the collar 225 and similarly arranged with respect to the shoes but is removable from a pair of separate threaded shaft portions 229, 230.

The shoes 220 may be mounted on a thin back plate 231 as in Fig. 20 or on a back plate 232 (Fig. 21) which is mounted on a deck (not shown) and has a bevelled bottom face 233 forming a central knife edge 234 of ring formation. The back plate 232 is thin enough to warp or twist about the knife edge 234 as a pivot in response to the thrust, and is accordingly a radially self-aligning support for the bearing shoes. In Fig. 22 another self-aligning base is shown wherein the lower face 235 of mounting ring 236 is bevelled and bears upon a similarly bevelled upper face 237 of a supporting ring 240.

As shown in Figs. 23 and 24, the same shoes 220 may be mounted upon pivoted discs 250 retained in cages 251. The pivoted discs 250 may be supported on support discs 252 which are held in a cover plate 253 as shown in Fig. 24. The pivoted discs 250 may be supported on stationary pins 254 fixed in a plain base ring 255 as shown in Fig. 25, or similar pins 254 may be mounted in a bevelled ring 256 which overlies an aligned bevelled base ring 257 as shown in Fig. 26. Moreover such pivoted discs 250 may be supported on a double equalizing base 260 as shown in Fig. 27 which may have lower discs 259 similar to those in the equalizing structure shown in my issued Patent No. 2,299,237, granted October 20, 1942. However preferably all but one of the pivoted discs 259 of Fig. 27 have upper spherical protuberances 261 as shown in Fig. 28, thereby providing a much improved equalizing effect, while one of the discs 259 has a protuberance 261 having a cylindrical face, as indicated in Fig. 29. The cylindrical face stabilizes the equalizer system while the spherical faces facilitate four-point support between the upper and lower equalizer elements.

It will be appreciated that the flat back shoes illustrated in the drawings are well adapted for use with a wide variety of mounting means other than the mounting means shown in the drawings, and this versatility is particularly advantageous. Moreover one specific shoe, as illustrated in Fig. 5 for example, can be used in mountings of various diameters ranging from very small to very large, without any change in the shoe whatsoever.

While the shoes shown and described herein have flat backs, and the mounting means are provided with means for tilting the bearing shoes at an angle to the path of relative movement, the shoe backs may of course be bevelled or provided with ridges or knife edges or otherwise provided with tilting means whereby some of the advantages of the invention may be realized while using plain flat faced mounting means. However, shoes having flat, non-bevelled backs are particularly advantageous, because they can be mass produced and used in combination with a wide variety of different mounting means.

It will also be appreciated that the radial grooves between the shoes may be of any desired cross sectional shape, with the dowels made to conform to that shape. Moreover, while specific means including a rim key has been shown as one preferred means for securing the sections of a split mounting ring to a deck, the deck may of course be recessed to receive and retain the mounting ring sections or various other means may be employed with advantage for this purpose. Moreover, while the combination of cotter pins and lip dowels represents one method of securing the shoes to the mounting ring, this can be done in other ways including cotter keys or eccentric dowels, for example. Moreover in some cases the shoes need not be affixed to the mounting ring, but may simply rest upon the mounting ring while spaced between dowels and thereby secured against rotation on the mounting ring.

While I have shown and described bearings which utilize eight shoes, it will be understood that any number of shoes, from one to twenty or more may be utilized in circular or other arrangements. Moreover the shoes need not be immediately adjacent to one another, since alternate shoes shown in Fig. 1, for example, could be removed without rendering the bearing inoperative.

From the foregoing it will be realized that pivoted shoes in accordance with this invention may be mounted so as to support the straight line reciprocating motion of the table of a planer, for example. They may also be mounted so as to support the circular motion of a boring mill table, for example. They may be mounted so as to carry the circular motion of a cylindrical journal as in a steam turbine. They may be formed with spherical faces for carrying mated rotating spherical members. They may also be made with conical faces for supporting rotating conical members. Obviously they may be made with toric faces for supporting rotating toric rings. Shoes having cylindrical faces can be mounted so as to permit the rotation of the journal and its axial reciprocation as well. Spherical shoes having spherical members can be mounted for supporting not only the rotation of a spherical member but also any other motion about the center of the sphere, as in the wobbling motion of a crusher shaft, for example.

Although the thrust bearings shown and described herein usually operate in a bath of oil, they can be run upon films of any other lubricant applied in any suitable manner, as by jet or spray for example, that will maintain complete films which respond to the known laws of hydrodynamic lubrication.

In a bearing of the non-reversible type, as indicated in Fig. 8, the bevelled edge need not necessarily lie as shown, passing through the center of gravity of the shoe. It can be moved toward the trailing end of the shoe, thereby spacing the center of gravity of the shoe toward the leading end of the shoe and assuring positive seating in tilted position, even at relatively low speeds or at extremely high speeds using light lubricant. It gives added stability to the lubricant film carrying the load when the runner is revolving, and this is an important feature of the invention.

However, for reverse bevels as shown in Figs. 1-3 and 10, 11, the common intersection of the knife edges must be substantially at the position corresponding to the center of gravity of the shoe. Thus the support for the shoe would ordinarily have a blunt pyramidal type peak upon which the shoe is to pivot, unless the center of pressure of the lubricant film lies within the area of the bevelled face which extends toward the leading edge from the knife edge about which the shoe is to tilt.

Notwithstanding the foregoing difficulties, the shoe is caused to lie down firmly by reason of the bevelled shoe face ends which appear more particularly in Figs. 1-3 and 10, 11. Thus I am able to utilize the lubricant drag as it contacts the leading end of the shoe to cause the shoe to lie down firmly against the supporting bevelled surface whether the bearing is unidirectional or is reversible. This firm lie-down tends to prevent vibration upon the pivot which might occur at very high speed with a very light lubricant if the shoe is supported on a very sensitive point pivot.

It will be appreciated that the mounting rings and shoe cages may be split through the line corresponding to the radial center line of the shoe instead of (or also) through the centers of opposite dowels, for example, or in other ways found to be expedient. The halves can, if desired, be bolted together tangentially in either event.

For ready interchangeability, with single dowels between adjacent shoes, the dowels are preferably at the ends of a tangent to the mean diameter of the shoe face, whether or not the shoe has a circular or flat inner face. The distance between dowels is preferably the same for all faces, having the same radial width. Hence a given shoe face can be placed at nearly any distance from a shaft center. Care need be taken to have the opposing runner face cover the shoe face. The shoe face can be of any shape from circular to square, or elliptical to rectangular, or trapezoidal, etc. The shoe face can be centered as to the dowels, or the leading portion of the face of the shoe may be longer or shorter than the trailing portion of the face of the shoe. Hence the distances between dowels are an important element of standardization to which my bearings and shoes are particularly well adapted.

In accordance with this invention it is possible to place on dowels of known spacing and diameter any desired shoe face, whether or not the shoe face beyond the connecting tangent is large or small or radially farther from or closer to the outer edge than the inner edge of the shoe.

While I have described my invention with reference to several specific embodiments thereof, it will be apparent to those skilled in the art that various changes other than those referred to above may be made in the form of the bearing structures; that equivalent elements may be substituted for those specifically illustrated in the drawings, and that certain features of the invention may at times be used to advantage independently of the use of other features; all within the scope and spirit of the invention as defined in the appended claims.

Having thus described my invention, I claim:

1. A bearing comprising a base and an adjacent runner element movable relative to said base, a shoe mounted on said base, and tilting means arranged between said base and shoe at an oblique angle to the path of relative movement of said base and runner for tilting said shoe diagonally to the path of said relative movement.

2. A bearing comprising a base and a runner element movable in a curved path relative to one another, a shoe having a bearing face and a back adjacent to said base substantially parallel to said face, the portion of said base which lies adjacent to the shoe back having a plurality of faces which lie at angles to one another with a knife edge therebetween, said shoe having capacity to tilt about said knife edge in response to said relative movement of said base and runner element, said knife edge being disposed at an angle to the path of said relative movement and at an angle to a line perpendicular to said path, said shoe back and base having mating surfaces adapted for face to face contact when the shoe is in its tilted position, and cooling means connected to said base for cooling said base directly, thereby cooling said shoe through the face contact of said mating surfaces while there is relative movement between the base and runner element.

3. A bearing comprising a base and a runner element movable in a curved path relative to one another, a shoe having a bearing face and a back adjacent to said base substantially parallel to said face, the portion of said base which lies adjacent to the shoe back having a plurality of faces which lie at angles to one another with a knife edge therebetween, said shoe having capacity to tilt about said knife edge in response to said relative movement of said base and runner element, said knife edge being disposed at an angle to the path of said relative movement and at an angle to a line perpendicular to said path, and said base and runner element having capacity for relative movement forward and in reverse, and wherein at least another face and another knife edge are formed on said base, whereby said shoe tilts over one knife edge for forward relative movement and tilts over another knife edge for reverse relative movement.

4. A bearing comprising a base and a runner element movable in a curved path relative to one another, a shoe having a bearing face and a back adjacent to said base substantially parallel to said face, the portion of said base which lies adjacent to the shoe back having a plurality of faces which lie at angles to one another with a knife edge therebetween, said shoe having capacity to tilt about said knife edge in response to said relative movement of said base and runner element, said knife edge being disposed at an angle to the path of said relative movement and at an angle to a line perpendicular to said path, a pair of spaced dowel elements carried by said base, said shoe being retained between said dowel elements, and portions of the shoe adjacent to the dowel elements being cut away to provide clearance between the shoes and the dowel elements.

5. A rectangular shoe for a bearing comprising a body piece of rigid material having a flat bearing face, a flat back parallel to said bearing face, parallel flat end walls, a flat inner side wall, a flat outer side wall which is parallel to said flat inner side wall, both said side walls being perpendicular to said end walls, and wings extending endwise from said end walls, said wings having at their ends semi-cylindrical bores which extend partially into said body piece.

6. A shoe for a bearing comprising a body portion having substantially parallel face and back surfaces, side and end walls, one of said side walls having the form of an arc of a circle and the side walls being arranged as radii of said circle, and flanges extending endwise from said body portion end walls, each flange having a mounting bore intermediate its sides, each flange being cut away such that its end faces are tapered inwardly relative to said radii toward each adjacent body portion side wall.

7. A bearing comprising a base and a runner element movable in a curved path relative to one another, a shoe having a bearing face and a back adjacent to said base substantially parallel to said face, the portion of said base which lies adjacent to the shoe back having a plurality of faces which lie at angles to one another with a knife edge therebetween, said shoe having capacity to tilt about said knife edge in response to said relative movement of said base and runner element, and said knife edge being disposed diagonally across at least a part of the path of said relative movement.

8. A bearing comprising a base and a runner element movable in a curved path relative to one another, a support, a shoe tiltably carried on said support, said shoe having a bearing face with bevelled portions at its leading and trailing ends, means for furnishing lubricant between said bearing face and said runner, and means for restricting the tilting movement of said shoe to a fixed predetermined angle with respect to the plane and path of said relative movement, whereby the lubricant film between said bearing face and runner includes a sharply inclined wedge portion, an intermediate wedge portion, and a third portion of less thickness than said sharply inclined wedge portion.

9. A thrust bearing comprising a circular mounting ring, a flat back shoe supported on said mounting ring, said shoe having a flat face portion parallel to said flat back, a runner adapted to revolve in a circular path adjacent to said flat face portion with a lubricant film therebetween, and tilting means including a knife edge disposed parallel to the working face of said runner and at an angle to the radius of said mounting ring whereby the outer side of the shoe tilts downwardly in response to the rotation of the runner and the lubricant film formed between said runner and said flat face portion is thicker at the outer edge of the shoe than at its inner edge.

10. A shoe for a bearing comprising a body portion having a flat bearing face, a flat back, end walls disposed between said face and back in planes at angles to one another, an arcuate outer side wall, a substantially flat inner side wall, and wings extending from said end walls.

11. The shoe defined in claim 10, wherein the flat face is substantially trapezoidal in form.

12. The shoe defined in claim 10, wherein the flat face is beveled adjacent both of said end walls.

13. A shoe for a bearing comprising a piece of rigid material having flat substantially parallel face and back surfaces, end walls between said surfaces, an inner side wall, a curved outer side wall, and a groove formed in said back surface extending from said inner side wall to said outer side wall.

14. A bearing including a mounting member with spaced post elements fixed thereon, a shoe comprising a body portion having a flat face, a flat back, inner and outer side walls, end walls, and wings formed on the end walls extending endwise therefrom, said wings and said body portion having opposed bores constructed and arranged to receive the posts of said mounting member, said bores extending only partially into said body member but completely through said wings.

15. The bearing defined in claim 14 wherein portions of said wings located inwardly of said bores are cut away to provide radial clearance for removing said shoe radially outwardly from said posts.

16. In a thrust bearing, a deck, an individual mounting plate having a circular bore therein, means for retaining said mounting plate against rotation on said deck, a disc in said circular bore, said disc having a flat face portion substantially parallel to said mounting plate and also having a bevelled face portion intersecting said flat face portion to form a straight edge, and means for adjustably securing said disc against rotation relative to said mounting plate and thereby regulating the position of said straight edge.

17. In a bearing, relatively movable members at least one of which has a straight-line reciprocating path, a mounting plate, a plurality of dowel members equally spaced along said mounting plate, wall means extending upwardly forming a reservoir for lubricant above said mounting plate, a plurality of spaced-apart bearing shoes supported in alignment on said mounting plate between spaced dowel members, said shoes having end wings forming staggered angularly disposed channels therebetween, and dam means in said reservoir blocking the flow of lubricant in said reservoir and causing it to circulate through said staggered channels in response to the movement of said relatively movable members.

18. In a bearing for an element movable in a straight line path, a mounting element, spaced post means extending upwardly from said mounting element, transverse ridges on the upper face of said mounting element spaced between said post means, and a plurality of bearing shoes having bearing faces adjacent to the path of said movable element, each bearing shoe being supported on one of said ridges intermediate said post means with capacity to tilt about its supporting ridge in response to the movement of said movable element.

19. A thrust bearing comprising a revolving runner, a deck, a plurality of dowels arranged in a closed path around said deck, bearing shoes supported on said deck between said dowels, said bearing shoes having bearing faces immediately adjacent to one face of said revolving runner with lubricant therebetween, and said shoes having substantially tangential inner walls spaced apart from one another and outwardly directed channels between said shoes, whereby the lubricant set into motion by the revolving runner is directed along said substantially tangential inner walls and impinges upon the wall of the adjacent channel and flows outwardly through said channel.

20. The thrust bearing defined in claim 19, wherein a lubricant return groove is formed in the back of each shoe in position for receiving the outwardly directed lubricant from said channels and permitting it to return to the inner side of said shoe.

21. A bearing comprising a deck, a plurality of ring portions, means for assembling said ring portions together in the form of a complete ring on said deck, split dowels at the confronting ends of said ring portions, whole dowels arranged at spaced points on said ring portions, a plurality of shoes, and means for retaining said shoes between said split and whole dowels.

22. The bearing defined in claim 21 wherein the retaining means includes permanent retaining means adapted to overlap said shoes fixed on alternate dowels, and removable fastening means engageable upon the intervening dowels.

23. A bearing comprising a base and a runner element movable in a curved path relative to one another, a plurality of spaced-apart shoes disposed between said base and said runner element, fluid lubricant between said shoes and runner, at least one of said shoes having a substantially flat inner face disposed in the general direction of said curved path whereby the lubricant is caused to circulate along said flat face and to flow against the side of the adjacent shoe and outwardly between the shoes in response to said relative movement, and restraining means disposed in the path of outward flow of said lubricant limiting the rate of said flow.

24. A bearing comprising a base and an adjacent runner movable relative to said base, a shoe having a bearing face adjacent to said runner, said shoe having a leading end and a trailing end, tilting means for tilting said shoe relative to said base with the leading end moving generally away from said runner and the trailing end moving generally toward said runner, said tilting means including angle control means for tilting said shoe at an oblique angle to the plane and path of said relative movement, and cooling means for cooling the leading end of the shoe to maintain it at a lower temperature than the trailing end.

25. A unidirectional thrust bearing comprising a runner moving in a single direction, a mounting piece, a shoe on said mounting piece with its face adjacent said runner, said shoe having a leading end and a trailing end, said leading end being the end first passed by a given point on said moving runner and said trailing end being the end last passed by said given point, a tilting edge formed between said mounting piece and said shoe, said tilting edge being substantially straight and extending at an oblique angle to a straight line extending between the centers of said leading and trailing ends, and said tilting edge being nearer the trailing end than the leading end of said shoe.

26. A bearing comprising a base, an adjacent runner element movable relative to said base, a shoe between said base and runner element, means forming a tilting edge on said base, said edge being diagonally arranged for tilting said shoe at an oblique angle to the path of said relative movement, and damper means on said base, said damper means extending toward said shoe and being effective upon the shoe to prevent said shoe from vibrating along the axis of tilt.

27. A reversible bearing comprising a base, a runner element movable reversibly relative to said base, a mounting element, means for supporting said mounting element on said base, a shoe having its back on said mounting element and its face adjacent to said runner element, said mounting element having bevelled top and bottom faces forming linear tilting edges thereon, and means for maintaining said edges in a fixed angular relation to said base, whereby the shoe tilts about one bevel in response to relative rotation in one direction and the shoe and mounting element tilt as a unit about the other bevel in response to relative rotation in the other direction.

28. In a reversible bearing, a base, a runner movable relative to said base along a predetermined path, a disc with its bottom face supported on said base, and a shoe supported on the top face of said disc with its face immediately adjacent said runner, said disc having bevelled top and bottom faces forming substantially linear tilting edges, said tilting edges extending at opposite, oblique angles to the path of relative movement of said runner and said base.

29. A bearing comprising a relatively movable shoe and runner, means constraining said relative movement to a predetermined path, and supporting means for the shoe, said supporting means having a tilting edge contacting said shoe and disposed at an oblique angle across said path.

30. A bearing comprising a relatively movable base and runner, a shoe intermediate said base and runner, and a shoe support intermediate said shoe and base, said support and base having relatively inclined adjacent faces forming a substantially linear tilting edge extending diagonally relative to the path of relative movement of said base and runner, and said support and shoe having relatively inclined adjacent faces forming another substantially linear tilting edge extending diagonally relative to said path.

31. A bearing comprising a relatively movable base and runner, means constraining said relative movement to a curved path, a shoe located intermediate said base and runner, and supporting means between the shoe and base forming a tilting edge disposed at an oblique angle to the path of relative movement of said base and runner.

32. A bearing comprising a support having a plurality of beveled surfaces arranged in a closed, arcuate path thereon, said beveled surfaces coacting with the support forming substantially linear tilting edges which extend diagonally across said path, and a plurality of shoes supported on said support above and in contact with said tilting edges.

33. The bearing defined in claim 32, wherein two of said beveled surfaces intersect with one another under a common shoe, thereby forming two of said tilting edges which are arranged at angles to one another under said shoe.

34. A bearing comprising a support having a flat upper surface intersected by a beveled surface forming a linear tilting edge, and a bearing shoe having a bearing face, a substantially flat back and sides and ends, said back including a flat surface portion contacting the flat upper surface of said support, a portion of said back extending in spaced relation above said beveled surface, said beveled surface extending diagonally relative to said sides and ends, whereby said shoe has capacity to tilt along said linear tilting edge at an oblique angle to its sides and ends.

35. A bearing comprising a mounting ring, spaced dowels upstanding from said mounting ring dividing said mounting ring into a plurality of sections, said dowels being arranged in a substantially circular path, each said section having a flat surface and having a beveled surface intersecting said flat surface forming a substantially linear tilting edge extending at an oblique angle to said circular path, and shoes on said mounting ring loosely connected to said dowels.

References Cited in the file of this patent

UNITED STATES PATENTS

| | | |
|---|---|---|
| 1,158,424 | Banner | Nov. 2, 1915 |
| 1,173,369 | Moore | Feb. 29, 1916 |
| 1,341,205 | Barnaby | May 25, 1920 |
| 1,361,073 | Kingsbury | Dec. 7, 1920 |
| 1,754,324 | Kingsbury | Apr. 15, 1930 |
| 2,109,852 | Scribner | Mar. 1, 1938 |
| 2,133,604 | Wells | Oct. 18, 1938 |
| 2,137,487 | Hall | Nov. 22, 1938 |
| 2,299,237 | Howarth | Oct. 20, 1942 |
| 2,314,703 | Howarth | Mar. 23, 1943 |
| 2,449,327 | Schlitters | Sept. 14, 1948 |

FOREIGN PATENTS

| | | |
|---|---|---|
| 263,378 | Great Britain | Dec. 30, 1926 |
| 593,261 | Great Britain | Oct. 13, 1947 |
| 478,378 | France | Sept. 18, 1915 |
| 661,122 | France | July 22, 1929 |
| 420,847 | Germany | Nov. 2, 1925 |
| 514,691 | Germany | Dec. 16, 1930 |